No. 828,092. PATENTED AUG. 7, 1906.
J. G. CRAWFORD.
ELECTRIC MOTOR SUPPORT.
APPLICATION FILED JAN. 2, 1904. RENEWED SEPT. 18, 1905.
3 SHEETS—SHEET 2.
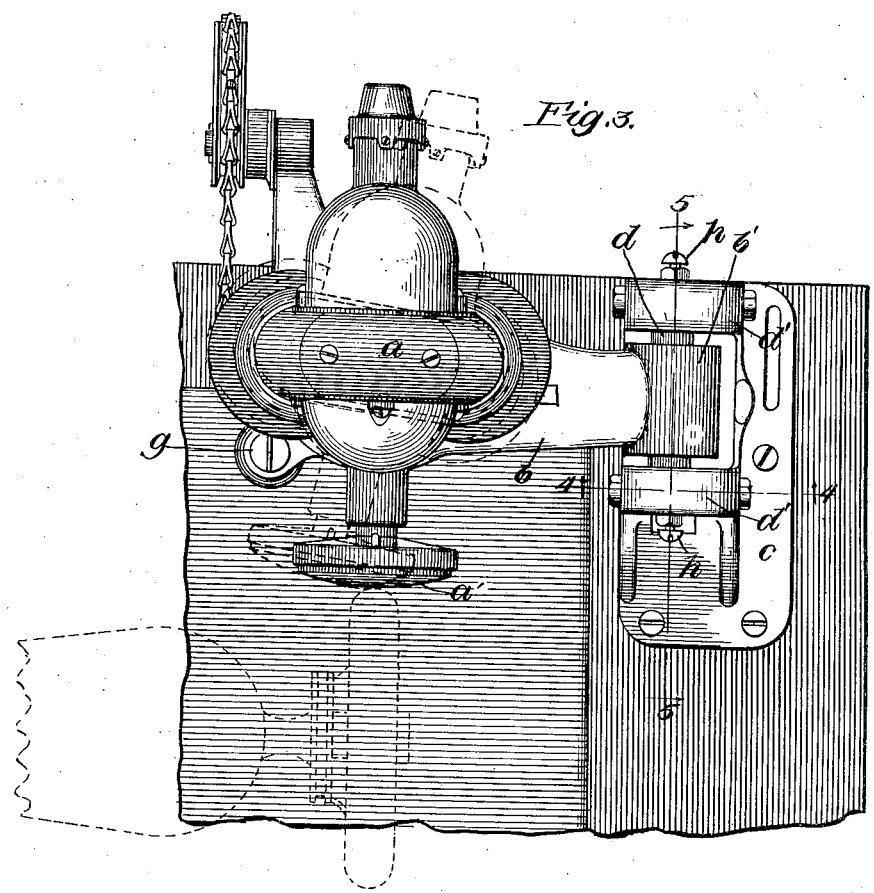
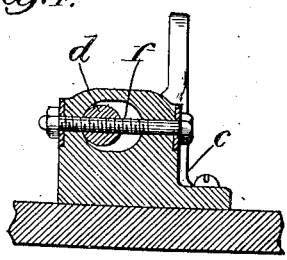
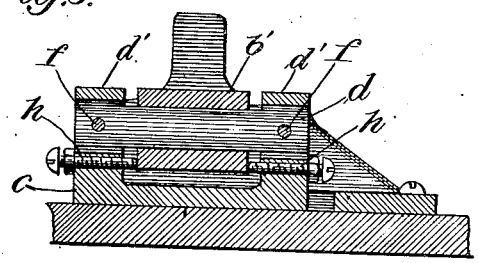
Witnesses:
O. M. Wermuth
N. W. Leach
Inventor:
John G. Crawford.
By Barton & Danner
Attorneys No. 828,092. PATENTED AUG. 7, 1906.
J. G. CRAWFORD.
ELECTRIC MOTOR SUPPORT.
APPLICATION FILED JAN. 2, 1904. RENEWED SEPT. 18, 1905.

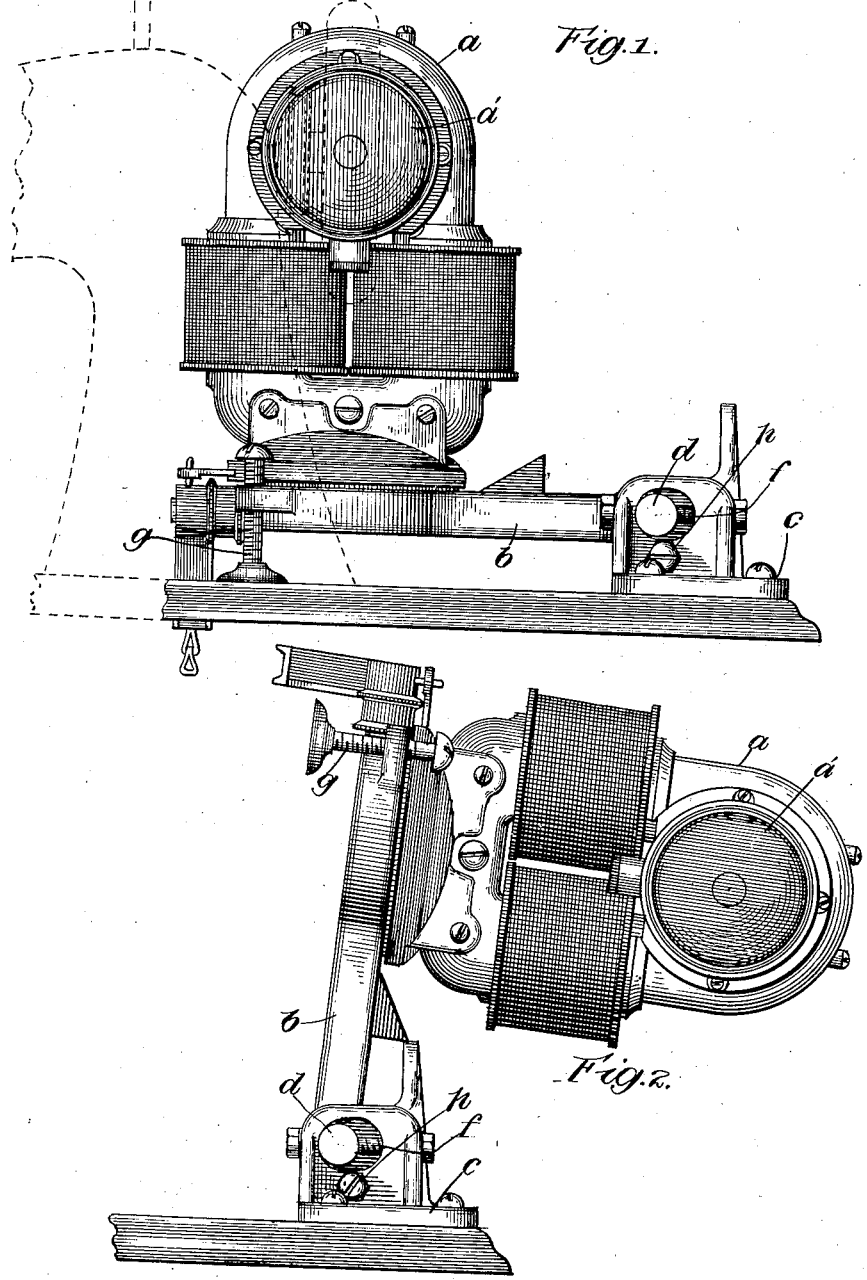

3 SHEETS—SHEET 3.

Witnesses:
O. M. Heinrich
H. W. Leach

Inventor:
John G. Crawford.
By Barton & Tanner
Attorneys:

UNITED STATES PATENT OFFICE.

JOHN G. CRAWFORD, OF LA GRANGE, ILLINOIS, ASSIGNOR TO WESTERN ELECTRIC COMPANY, OF CHICAGO, ILLINOIS, A CORPORATION OF ILLINOIS.

ELECTRIC-MOTOR SUPPORT.

No. 828,092.   Specification of Letters Patent.   Patented Aug. 7, 1906.

Application filed January 2, 1904. Renewed September 18, 1905. Serial No. 278,947.

*To all whom it may concern:*

Be it known that I, JOHN G. CRAWFORD, a subject of the King of Great Britain, residing at La Grange, in the county of Cook and State of Illinois, have invented a certain new and useful Improvement in Electric-Motor Supports, of which the following is a full, clear, concise, and exact description.

My invention relates to an electric-motor support, and more particularly to a support for motors of the type which are used to drive sewing-machines.

My object is in general to provide a construction by which the motor may be readily adjusted in operative relation to the wheel of the sewing-machine, and more particularly to permit the motor to be tilted back out of the way when it is desired to get at the mechanism of the sewing-machine, as for oiling, or where the machine is arranged to be let down below the table.

I will describe my invention by reference to the accompanying drawings, in which—

Figure 6:
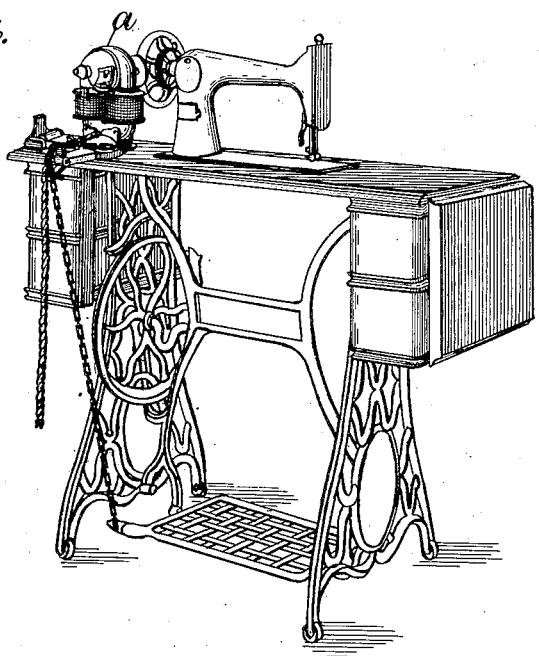

Figure 1 is a view in elevation of a motor supported according to my plan, a portion of the sewing-machine being indicated in dotted lines. Fig. 2 is a similar view showing the motor tilted up to an alternate position. Fig. 3 is a plan view of the motor and support. Fig. 4 is a detail sectional view on line 4 4 of Fig. 3, showing a portion of the bracket carrying the arm upon which the motor is mounted. Fig. 5 is a detail sectional view of said bracket on line 5 5 of Fig. 3. Fig. 6 is a perspective view of a sewing-machine, showing a motor applied thereto; and Fig. 7 is another view showing the motor tilted so that the sewing-machine can be let down into the bed below the table.

The same letters of reference are used to designate the same parts wherever they are shown.

The motor $a$ is of a well-known type and carries a friction-disk $a'$, which is adapted to engage with the hand-wheel of the sewing-machine to drive the same. The motor is so mounted upon the end of the supporting-arm $b$ that it can be turned slightly on a vertical axis, as shown in dotted lines in Fig. 3, to regulate the speed of the sewing-machine, a spring in the base of the motor-frame serving to return the motor to its normal position. This feature is well known in the art and will not be particularly described.

Figure 7:
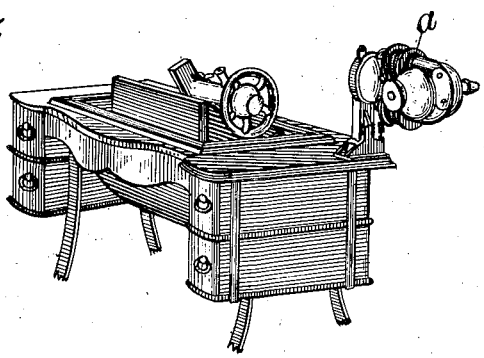

The supporting-arm $b$, which carries the motor at one end, is hinged at the other end to the table or, rather, to the bed-plate or bracket $c$, fastened to the table, so that the motor may be tilted from the operative position shown in Fig. 1 to the position shown in Figs. 2 and 7, so as to permit the oiling or other manipulation of the sewing-machine without making it necessary to detach the motor bodily from the table. This feature I believe to be novel with me and have found it of very great value, since it makes the practical application of electric motors to sewing-machines a very simple matter. The ordinary user of a sewing-machine is not competent to detach the motor every time it is desired to oil the machine or sink it into the bed of the table and then attach the motor again whenever it is desired to use the machine, making the nice adjustment which the friction driving-gear necessitates.

The mechanical features of the motor-support shown in the drawings are also very advantageous. The tilting arm $b$, which carries the motor, is journaled at one end $b'$ to an arbor $d$, which is mounted between two lugs $d'$ $d'$ upon the stationary bed-plate or bracket $c$. This arbor $d$ is arranged to be adjusted in a direction transverse to its axis by means of the screws $ff$ in the lugs $d'$ $d'$, said screws passing freely through said lugs, but being tapped into and, indeed, supporting said arbor. By manipulating these screws it will be apparent that a very accurate adjustment of the friction driving-disk with relation to the hand-wheel of the machine may be secured. The portion of the arm $b$ which is journaled upon the arbor $d$ is kept from being displaced longitudinally upon the arbor by screws $h$ $h$, mounted in the lugs $d'$ $d'$ and abutting against the ends of the collar or journal carried by the arm $b$. An adjustment of the arm lengthwise of the arbor is possible by manipulating the screws $h$ $h$ in an obvious manner.

A further means of adjustment which I have provided consists of an adjustable leg which is formed by a screw $g$, mounted near the end of the tilting arm $b$. By raising or lowering this screw a vertical adjustment of the driving-disk with relation to the hand-wheel of the machine may be secured.

Having thus described my invention, I claim as new and desire to secure by Letters Patent—

1. The combination with a sewing-machine table having a machine movably mounted thereon, of a motor having a friction-disk adapted to drive the hand-wheel of the machine, and a support for the motor hinged to the table normally maintaining the motor in operative relation to said machine, said support being adapted to be swung to carry the motor out of the path of the machine; whereby the machine may be conveniently oiled and manipulated without detaching the motor from the table or interfering with its adjustment.

2. The combination with a sewing-machine table and the machine mounted on said table, of an electric motor having a friction-wheel adapted to drive the hand-wheel of the machine, a supporting-arm carrying the motor at one end and hinged at the other end to the table, and an adjustable leg for said supporting-arm, whereby the friction-wheel of the motor may be vertically adjusted with relation to the hand-wheel of the sewing-machine.

3. The combination with the bed-plate or bracket $c$ having lugs $d'$ $d'$, of an arbor $d$ extending between said lugs, screws $ff$ passing through said lugs and arbor, whereby the position of the arbor may be adjusted, a supporting-arm $b$ carrying a motor at one end and journaled at the other end upon said arbor, whereby the motor may be tilted upon the arbor as an axis, and a screw carried by said supporting-arm and forming an adjustable leg for the same.

4. The combination with a sewing-machine table having a machine mounted thereon, of a motor having a friction-disk adapted to drive the hand-wheel of the machine, and a supporting-arm for said motor hinged to the table and normally maintaining the motor in position such that said disk engages said hand-wheel, said arm being adapted to be swung to carry the motor away from the machine and break the engagement of said disk with said wheel; whereby the machine may be conveniently oiled and manipulated without detaching the motor from the table or interfering with its adjustment.

5. The combination with a sewing-machine table having a machine movably mounted thereon, of a motor having a friction-disk adapted to drive the hand-wheel of the machine, and an arm upon which said motor is mounted in position to operate said machine, said arm extending approximately parallel to the table away from the machine and being hinged to said table, said arm being adapted to be moved to carry the motor away from said machine; whereby the machine may be conveniently oiled and manipulated without detaching the motor from the table or interfering with its adjustment.

In witness whereof I hereunto subscribe my name this 10th day of June, A. D. 1903.

JOHN G. CRAWFORD.

Witnesses:
J. P. CRACRAFT
EDWIN H. SMYTHE.